Patented June 12, 1945

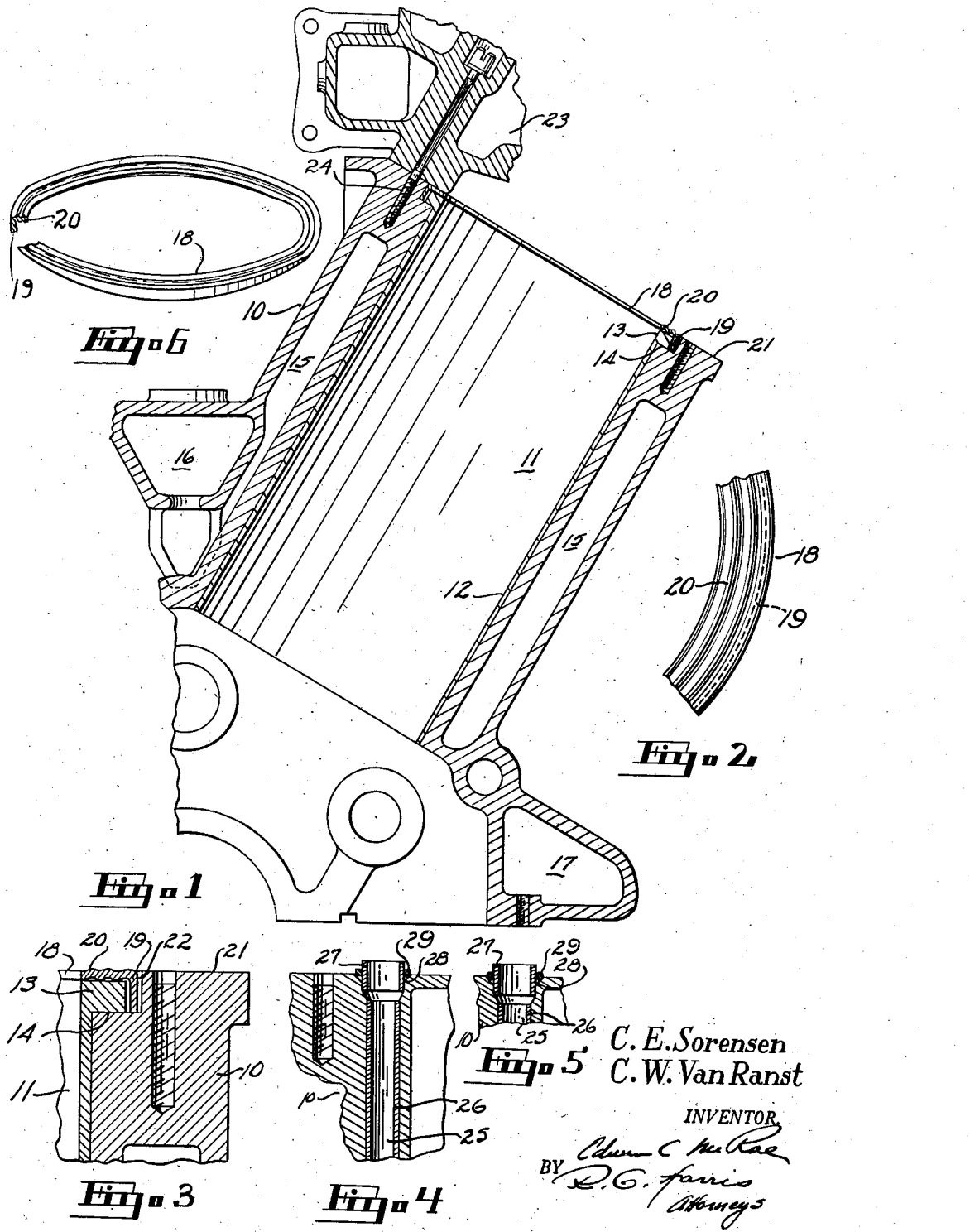

2,378,045

UNITED STATES PATENT OFFICE 2,378,045

CYLINDER CONSTRUCTION

Charles E. Sorensen, Detroit, and Cornelius W. Van Ranst, Dearborn, Mich., assignors to Ford Motor Company, Dearborn, Mich., a corporation of Delaware Application May 17, 1943, Serial No. 487,277

6 Claims. (Cl. 309—3)

This invention relates to the construction of an internal-combustion engine; and, more particularly, to a gasket construction to be used in such engines between the head and block thereof.

The purpose of this invention is to devise a gasket means to be applied between the block and head of a multicylinder internal-combustion engine comprising an individual gasket for each cylinder of the engine rather than an over-all gasket of the type usually used. An advantage of the present construction is the increased strength and efficiency particularly important in aircraft engines operating at high pressures and temperatures. Another advantage is the simplicity of the gasket structure itself and the ease with which it may be replaced. Still another advantage is the superior seal obtained between the block and the head and the fact that heat transfer between the block and the head is facilitated by omission of the conventional gasket over the greater part of the adjoining areas, thereby permitting direct contact between the two elements.

The use of small, individualized gaskets for the cylinders simplifies the supply problem particularly in connection with military vehicles as they are more easily handled and less susceptible to damage in shipment and installation. Finally, by centralizing the gasket material between abutting portions of the head and cylinders where such protection is required, it is possible to obtain better thermal contact between these two elements. At the same time, the accuracy of the assembly can be maintained within the chosen limits required when the head structure includes a camshaft driven by an intermediate shaft from the engine crankshaft as illustrated in co-pending application Serial No. 439,632, filed April 20, 1942.

With these and other objects in view, the invention consists in the arrangement, construction and combination of the various parts of the improved device, as described in the specification, claimed in the claims and illustrated in the accompanying drawing in which:

Fig. 1 is a transverse section through a portion of engine block and associated cylinder head.

Fig. 2 is a plan view of a portion of the gasket construction of the present invention.

Fig. 3 is an enlarged sectional view of a portion of Fig. 1.

Fig. 4 is a transverse section through the block in the vicinity of an oil line, showing the method of gasketing thereof.

Fig. 5 is a view corresponding to that of Fig. 4 showing an alternative oil line gasket.

Figure 6 is a perspective view of the cylinder gasket, a portion being broken away to show the sectional elevation thereof.

In Fig. 1, a transverse section of a V-engine of the type described in the above mentioned co-pending application Serial No. 439,632 is shown in which 10 indicates the block, 11 a cylinder, 12 a cylinder sleeve or liner having a flange 13 seated in the recess 14 of a block. The water jacketing 15 is fed from a longitudinal header 16, and 17 is a longitudinal reinforcing box section formed integral with the block and extending substantially its entire length. The cylinder gasket is shown at 18 (compressed by the head 23 at the left side and uncompressed prior to application of the head at the right) and, as best seen in Fig. 2, comprises a corrugated plate 20 generally conforming to a ring having an external depending flange 19 and formed of any of the usual metal gasket materials. The corrugations are arranged successively radially of the plate 20.

In use, the top surface of the cylinder liner flange 13 is located beneath the block surface 21 a distance equal to the thickness of the gasket stock. The depending flange 19 of the gasket is disposed between the outer circumference of the flange 13 in a channel 22 formed by an extension of the recess 14. The gasket is so proportioned that, prior to compression, the outer surface of the depending flange 19 is spaced a short distance from the outer face of the recess 22 and there is likewise a small clearance between the inner face of the depending flange 19 and the adjacent surface of the liner flange 13 as shown in Fig. 3. The head 23 is then applied and tightened in place by the studs 24, which compresses the gasket and flattens the corrugated plate 20 and the head is brought into exact bearing on the block surface 21 and now flat surface of the gasket 18. At the same time, the radial dimension of the gasket is increased slightly so that the outer surface of the depending flange 19 bears against the outer face of the channel 22 as shown best in the left side of Fig. 1.

In Figs. 4 and 5 another portion of the block is shown to indicate the manner in which apertures other than the cylinders proper are gasketed. For example, it is necessary to provide gaskets at the various interconnections between the head and block coolant jackets, oil lines, etc. In this instance, an oil line 25 is shown having an internal sleeve 26 and which would communicate with a similar line in the head, which is not shown since the construction is the same. This connection is effected by means of a nipple 27 inset in a counterbore in the block; and, accordingly, similarly inset in a counterbore in the head. A V-shaped groove 28 is formed around the aperture receiving the nipple, and a rubber bushing 29 is seated in this groove. The head is formed similarly, and when positioned over the block, pilots on the nipple 27 and compresses the rubber in its corresponding groove. This forms a very tight joint which is perfectly resistant under the temperatures obtaining for this particular service. The bushing 29 is in the form of a ring and may have a square section as in Fig. 4, or round as in Fig. 5.

An advantage of the present structure is that it breaks down the gasketing required into a number of small interexchangeable units. For instance, the size of the conventional over-all gasket now used in engines may be compared with the size of the individual combined gaskets which are required in the present installation. Moreover, since all of the gaskets required for the cylinder, for instance, are identical in form, they are readily interchangeable and the same consideration applies as well to the other gasket means used in connection with oil line or water-jackets. The principal advantage, however, lies in the fact that even under extraordinary pressures obtained in aviation engine service, it is possible to obtain a joint which is absolutely tight and at the same time have full and intimate contact between the head and block surfaces over the greater part of their abutting area. These requirements are impossible to meet in the conventional gasket manufactured and indeed it is most difficult to obtain a fluid-tight gasket when others than here shown are used.

Some changes may be made in the arrangement, construction and combination of the various parts of the improved device without departing from the spirit of the invention, and it is the intention to cover by the claims such changes as may reasonably be included within the scope thereof.

The invention claimed is:

1. In an aircraft-engine construction having a block, a cylinder formed in said block and a head attached to said block, gasket means interposed between said block and said head surrounding said cylinder comprising a thin metallic ring having a depending outer circumferential flange normal thereto, said ring having circumferential corrugations formed therein.

2. In an engine construction having a block, a cylinder formed in said block and a head secured to said block over said cylinder, comprising, a gasket having a ring body and a depending outer circumferential flange formed integrally from a single thickness of metal, said flange being normal to said ring, and said ring having circumferential corrugations formed therein.

3. In an engine construction having a block and a cylinder and a head secured to said block over said cylinder, a dry liner sleeve in said cylinder, a flange formed integral with said liner sleeve at the upper end thereof and disposed in a recess formed in said block, said recess extending circumferentially outwardly of said flange, gasket means comprising a substantially flat ring of a single thickness of metal and an outer circumferential depending flange, said depending flange being disposed in said recess outwardly of said liner flange, the ring portion of said gasket having circumferential corrugations formed therein, the upper surface of said sleeve in assembled position being positioned beneath the top surface of said block by an almost substantially equal to the thickness of the stock of which said gasket is formed.

4. In a motor construction having a block and a cylinder therein and a head secured to said block over said cylinder, a liner sleeve in said cylinder having a circumferential flange at the upper end thereof, said flange disposed in a recess in said block, the upper surface of said sleeve flange in its assembled position being spaced downwardly from the upper surface of said block, said recess extending circumferentially outwardly of the outer edge of said liner flange, a gasket comprising a substantially flat ring having a depending flange normal thereto associated with said liner, said ring portion overlying the upper surface of said sleeve flange and said depending flange being positioned in said recess outwardly of said sleeve flange, said ring portion of said gasket having circumferential corrugations, and the thickness of the stock of said gasket substantially equalling the distance said sleeve flanges is spaced below said block surface.

5. The structure of claim 4 which is further characterized in that when said head is tightened down with respect to said block, said ring portion is flattened and the outer surface of said depending flange bears against the circumferential wall of said recess.

6. In a motor construction, a block, a head, an aperture therebetween, leak-proof means for said aperture comprising a gasket having a thin ring section and a depending flange, a recess between said block and head surrounding said flange having a depth substantially equal to said gasket stock and formed to receive said ring section, a portion of said recess being of greater depth to receive said depending flange, and means in said ring portion to expand gasket radially when compressed between said block and said head.

CHARLES E. SORENSEN.
C. W. VAN RANST.